US012671139B2

(12) United States Patent
Surapaneni et al.

(10) Patent No.: US 12,671,139 B2
(45) Date of Patent: Jun. 30, 2026

(54) HIGH VOLTAGE BATTERY DEPLOYABLE EXHAUST SYSTEM

(71) Applicant: FCA US LLC, Auburn Hills, MI (US)

(72) Inventors: Sreekanth Surapaneni, Oakland, MI (US); Venkata Chagarlamudi, Rochester Hills, MI (US); Uday Mahakali, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 511 days.

(21) Appl. No.: 18/452,088

(22) Filed: Aug. 18, 2023

(65) Prior Publication Data

US 2025/0062490 A1 Feb. 20, 2025

(51) Int. Cl.
| | |
|---|---|
| *H01M 50/358* | (2021.01) |
| *B60L 50/64* | (2019.01) |
| *D03D 1/02* | (2006.01) |
| *D03D 15/283* | (2021.01) |
| *H01M 50/204* | (2021.01) |
| *H01M 50/249* | (2021.01) |
| *H01M 50/325* | (2021.01) |

(52) U.S. Cl.
CPC ........... *H01M 50/358* (2021.01); *B60L 50/64* (2019.02); *D03D 1/02* (2013.01); *D03D 15/283* (2021.01); *H01M 50/204* (2021.01); *H01M 50/249* (2021.01); *H01M 50/325* (2021.01); *D10B 2331/02* (2013.01); *D10B 2505/12* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 1,469,119 | A * | 9/1923 | Stallings | H01M 50/308 |
| | | | | 429/88 |
| 9,735,407 | B2 * | 8/2017 | Kusunoki | H01M 50/317 |
| 2008/0318121 | A1 * | 12/2008 | Takagi | H01M 10/643 |
| | | | | 429/120 |
| 2012/0045672 | A1 * | 2/2012 | Kruger | H01M 50/209 |
| | | | | 429/82 |
| 2015/0246650 | A1 * | 9/2015 | Nakajima | B60R 16/033 |
| | | | | 180/68.5 |
| 2022/0123409 | A1 * | 4/2022 | Roethinger | H01M 10/0525 |
| 2022/0200079 | A1 * | 6/2022 | Boddakayala | H01M 50/375 |
| 2022/0285784 | A1 * | 9/2022 | Lorenz | H01M 50/358 |

FOREIGN PATENT DOCUMENTS

| | | | | |
|---|---|---|---|---|
| JP | 2017050055 A * | 3/2017 | | H01M 50/30 |

* cited by examiner

*Primary Examiner* — Carlos Barcena
(74) *Attorney, Agent, or Firm* — Jeremy J. Klobucar

(57) ABSTRACT

A vehicle including a battery pack including a housing that stores a plurality of batteries for providing electric power to the vehicle. A plurality of vents are attached to the housing that are configured to expel exhaust gases generated by the plurality of batteries. A manifold is located proximate the housing for collecting the exhaust gases expelled by the plurality of vents, and a flexible conduit including an inlet is in communication with the manifold and an outlet is configured to expel the exhaust gases. The flexible conduit includes a non-deployed state where the flexible conduit is rolled or folded and stored in a storage space located proximate the manifold, and includes a deployed state where the flexible conduit extends outward from the vehicle upon receipt of the exhaust gases from the manifold.

18 Claims, 6 Drawing Sheets

HIGH VOLTAGE BATTERY DEPLOYABLE EXHAUST SYSTEM

FIELD

The present disclosure relates to a high voltage battery having a deployable exhaust system.

BACKGROUND

This section provides background information related to the present disclosure which is not necessarily prior art.

Vehicles with electric propulsion systems are becoming increasingly more common. Some electrically propelled vehicles include an electric drive motor at each wheel of the vehicle, and some electrically propelled vehicles include a front electric drive motor for rotating the front wheels of the vehicle and a rear electric drive motor for rotating the rear wheels of the vehicle. In either case, the electric drive motors receive power from a battery pack that includes a plurality of battery cells therein. Example battery cells include lithium-ion battery cells and lithium-metal battery cells.

Lithium-ion and lithium-metal battery cells sometimes undergo a process called thermal runaway during failure conditions. Thermal runaway may result in a rapid increase of battery cell temperature accompanied by the release of various gases, which in some cases may be flammable. These flammable gases may be ignited by the high temperature of the battery, which may result in a fire. Accordingly, in the event of a thermal runaway, it is desirable that the vehicle include features that assist in preventing, or at least substantially minimizing, the ignition of various gases that are generated during the thermal runaway.

SUMMARY

This section provides a general summary of the disclosure and is not a comprehensive disclosure of its full scope or all of its features.

According to a first aspect of the present disclosure, there is provided a vehicle that includes a battery pack including a housing that stores a plurality of batteries for providing electric power to the vehicle; a plurality of vents attached to the housing that are configured to expel exhaust gases generated by the plurality of batteries; a manifold located proximate the housing for collecting the exhaust gases expelled by the plurality of vents; and a flexible conduit including an inlet in communication with the manifold and an outlet configured to expel the exhaust gases, wherein the flexible conduit includes a non-deployed state where the flexible conduit is rolled or folded and stored in a storage space located proximate the manifold, and includes a deployed state where the flexible conduit extends outward from the vehicle upon receipt of the exhaust gases from the manifold.

According to the first aspect, the flexible conduit is configured to inflate after receipt of the exhaust gases from the manifold that extends the flexible conduit to the deployed state from the non-deployed state.

According to the first aspect, the flexible conduit is configured to inflate into the deployed state in about 50 milliseconds.

According to the first aspect, the flexible conduit is formed of a woven material.

According to the first aspect, the woven material is a woven polyamide material.

According to the first aspect, the plurality of vents include at least one vent that is connected to the manifold by a duct that extends between the at least one vent and the manifold, the duct being located exterior to the housing of the battery pack.

According to the first aspect, the duct is formed of a flexible material or a rigid material.

According to the first aspect, the plurality of vents include at least one vent that is connected to the manifold and expels the exhaust gases directly into the manifold.

According to the first aspect, each of the plurality of vents includes a one-way valve that are actuated to release the exhaust gases upon a predetermined pressure threshold in the housing being reached.

According to the first aspect, the predetermined pressure threshold is 100 millibars.

According to a second aspect of the present disclosure, there is provided a vehicle that includes a battery pack including a housing that stores a plurality of batteries for providing electric power to the vehicle; a first pair of vents attached to the housing that are configured to expel exhaust gases generated by the plurality of batteries; a second pair of vents attached to the housing that are configured to expel the exhaust gases generated by the plurality of batteries; a manifold located proximate the housing for collecting the exhaust gases expelled by the first pair of vents and the second pair of vents; a first pair of ducts connected to the first pair of vents and the manifold, the first pair of ducts configured to receive the exhaust gases expelled by the first pair of vents and communicate the exhaust gases to the manifold; and a flexible conduit including an inlet in communication with the manifold and an outlet configured to expel the exhaust gases, wherein the second pair of vents expel the exhaust gases directly into the manifold; and wherein the flexible conduit includes a non-deployed state where the flexible conduit is rolled or folded and stored in a storage space located proximate the manifold, and includes a deployed state where the flexible conduit extends outward from the vehicle upon receipt of the exhaust gases from the manifold.

According to the second aspect, the flexible conduit is configured to inflate after receipt of the exhaust gases from the manifold that extends the flexible conduit to the deployed state from the non-deployed state.

According to the second aspect, the flexible conduit is configured to inflate into the deployed state in about 50 milliseconds.

According to the second aspect, the flexible conduit is formed of a woven material.

According to the second aspect, the woven material is a woven polyamide material.

According to the second aspect, the first pair of ducts are each formed of a flexible material or a rigid material.

According to the second aspect, each of the vents includes a one-way valve that are actuated to release the exhaust gases upon a predetermined pressure threshold in the housing being reached.

According to the second aspect, the predetermined pressure threshold is 100 millibars.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
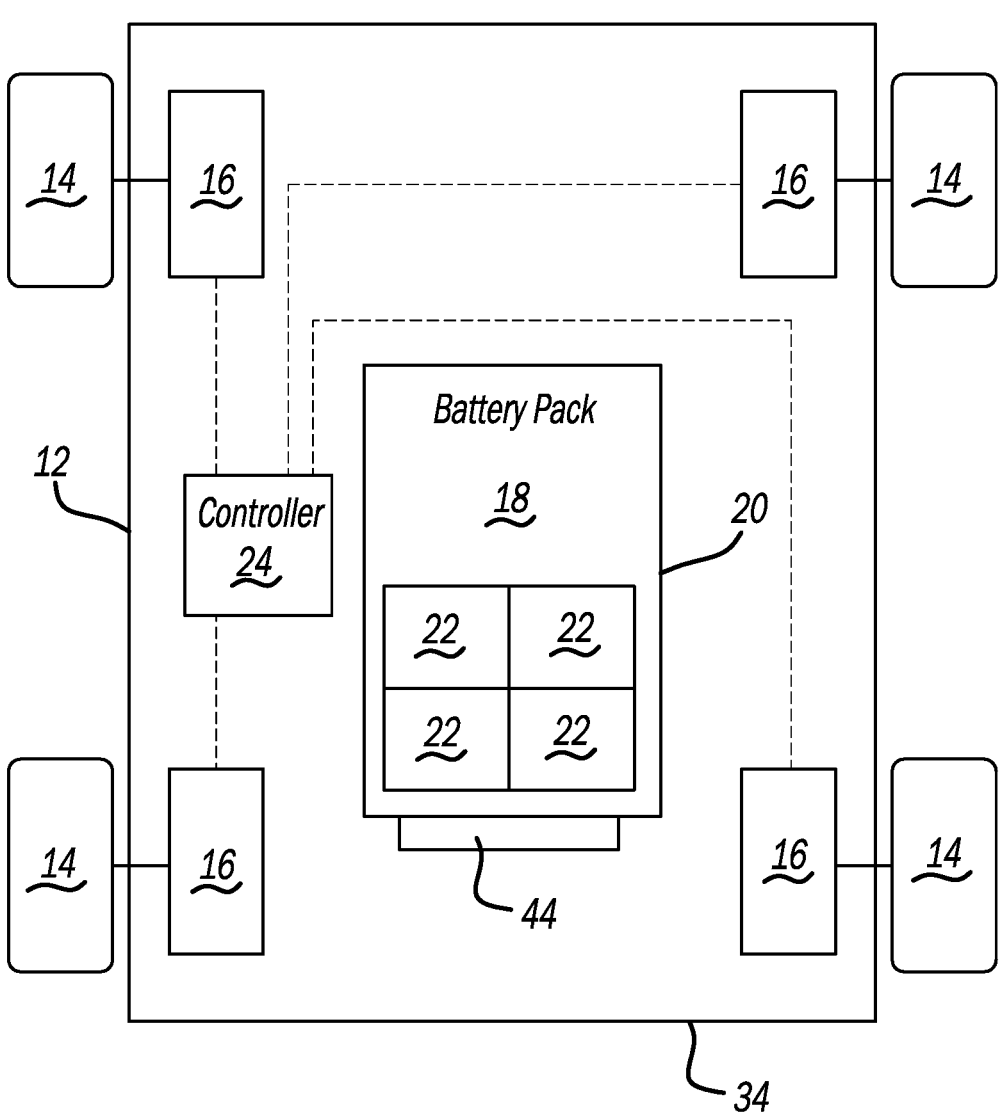
FIG. 1 is a schematic representation of a vehicle according to a principle of the present disclosure.

FIG. 1 schematically illustrates an electric vehicle 10 according to the present disclosure. Vehicle 10 includes a body 12, a plurality of wheels 14. In the illustrated embodiment, each wheel 14 is driven using a respective electric drive module 16 that receives electric power from a battery pack 18 having a housing 20 that encases a plurality of battery cells 22. Example battery cells 22 include lithium-ion battery cells, lithium-metal battery cells, and combinations thereof. It should be understood, however, that other types of battery cells 22 known to one skilled in the art may be used, without limitation. Housing 20 is preferably formed of a rigid metal material (e.g., steel, aluminum, and the like) that is resistant to puncture and is non-flammable.

While FIG. 1 illustrates four electric drive modules 16 such that each wheel 14 can be driven by a single electric drive module 16, it should be understood that vehicle 10 may include a single electric drive module 16 for driving a pair of wheels 14 (e.g., for driving the pair of front wheels 14 or the pair of rear wheels 14), or may include a pair of electric drive modules 16 with one of the electric drive modules 16 driving the front pair of wheels 14 and another of the electric drive modules 16 driving the rear pair of wheels 14. Regardless of the configuration selected, it should be understood that electric drive modules 16 receive a voltage or current from battery pack 18 that is utilized by the electric drive module 16 to drive the wheels 14 of the vehicle 10.

Vehicle 10 also includes a controller 24 in communication with each of the drive modules 16 and in communication with the battery pack 18. Controller 24 may be used to control electric drive modules 16 to control a speed of vehicle 10 and may also be used to monitor and/or communicate with various systems of vehicle such as an HVAC system (not shown), a vehicle braking system (not shown), and any other system that may be part of vehicle 10.

As noted above, battery cells 22 may sometimes undergo a process called thermal runaway during failure conditions of the battery cell(s) 22. Thermal runaway may result in a rapid increase of battery cell temperature accompanied by the release of various gases, which in some cases may be flammable. Example gases that may be released during a thermal runaway event include hydrogen ($H_2$), carbon monoxide (CO), carbon dioxide ($CO_2$), and various hydrocarbons including, but not limited to, methane, ethane, ethylene, acetylene, propane, cyclopropane, and butane. As these gases are released and the temperature of battery pack 18 increases, the pressure within battery pack 18 also increases.

Figure 2:
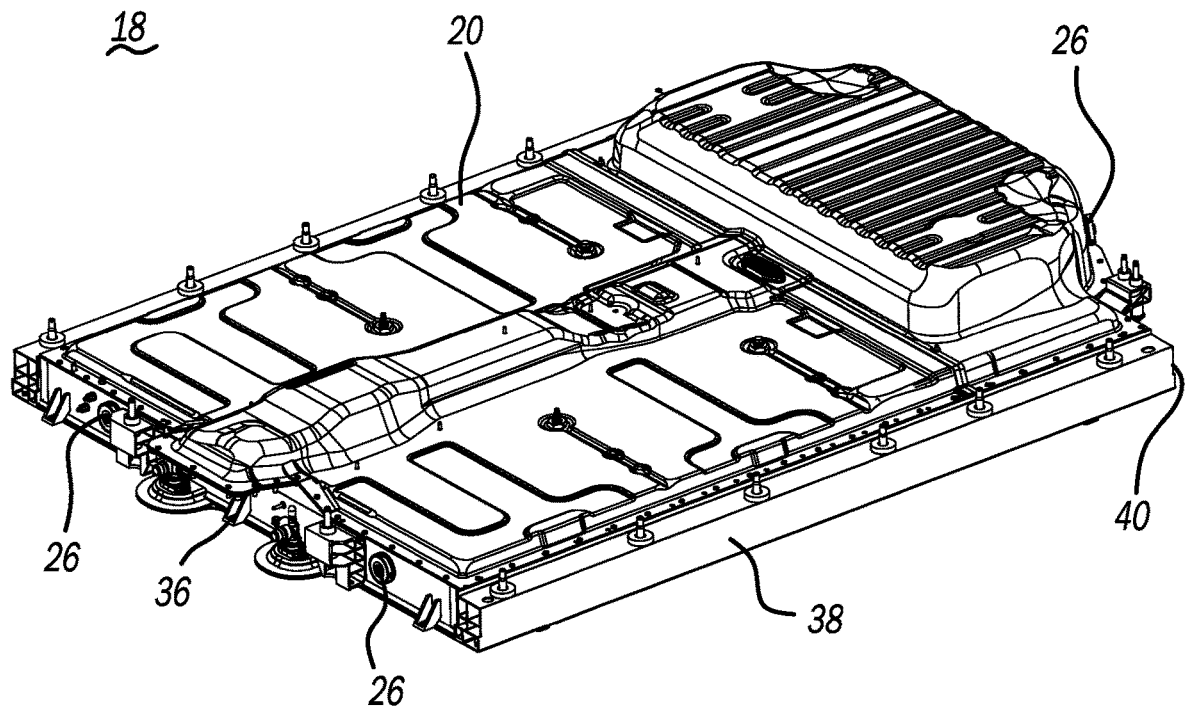
FIG. 2 is a perspective view of an example battery pack that may be used in the vehicle illustrated in FIG. 1.

Now referring to FIG. 2, it can be seen that housing 20 of battery pack 18 includes a plurality of discharge vents 26 that permit the pressure and gases to escape housing 20 during a thermal runaway event. Discharge vents 26 may each include a valve 28 (FIG. 3) that may be a one-way valve and opens upon a predetermined pressure threshold being generated within housing 16. For example, if the pressure within housing 20 reaches 100 millibars the valves 28 may open and permit the gases within housing 20 to exit the battery pack 18. Discharge vents 26 may be in communication with various conduits (not shown) located in battery pack 18, which direct the gases generated during the thermal runaway event to the discharge vents 26 to be expelled from battery pack 20.

Figure 3:
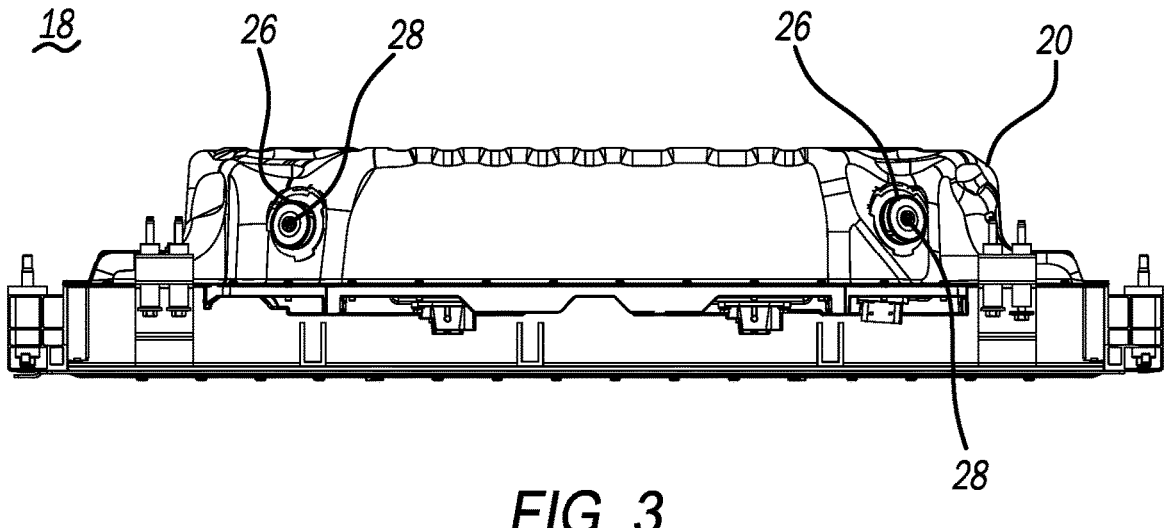
FIG. 3 is a rear perspective view of the example battery pack illustrated in FIG. 2.

While housing 20 may include discharge vents 26 including valves 28 for releasing the gases from battery pack 12, the gases released from battery pack 18 may collect beneath the vehicle 10. While only two pairs of discharge vents 26 including valves 28 are illustrated in FIGS. 2 and 3, it should be understood that battery pack 18 may include a greater number of discharge vents 26 having valves 28 without departing from the scope of the present disclosure. If the gases are at a sufficient temperature, the gases may combust after exiting battery pack 18 at a location beneath vehicle 10. If this occurs, there is the potential for other features of the vehicle 10 to also combust including, for example, the tires (not shown) of the wheels 14, hoses (not shown), vehicle brakes (not shown) and other features.

Figure 4:
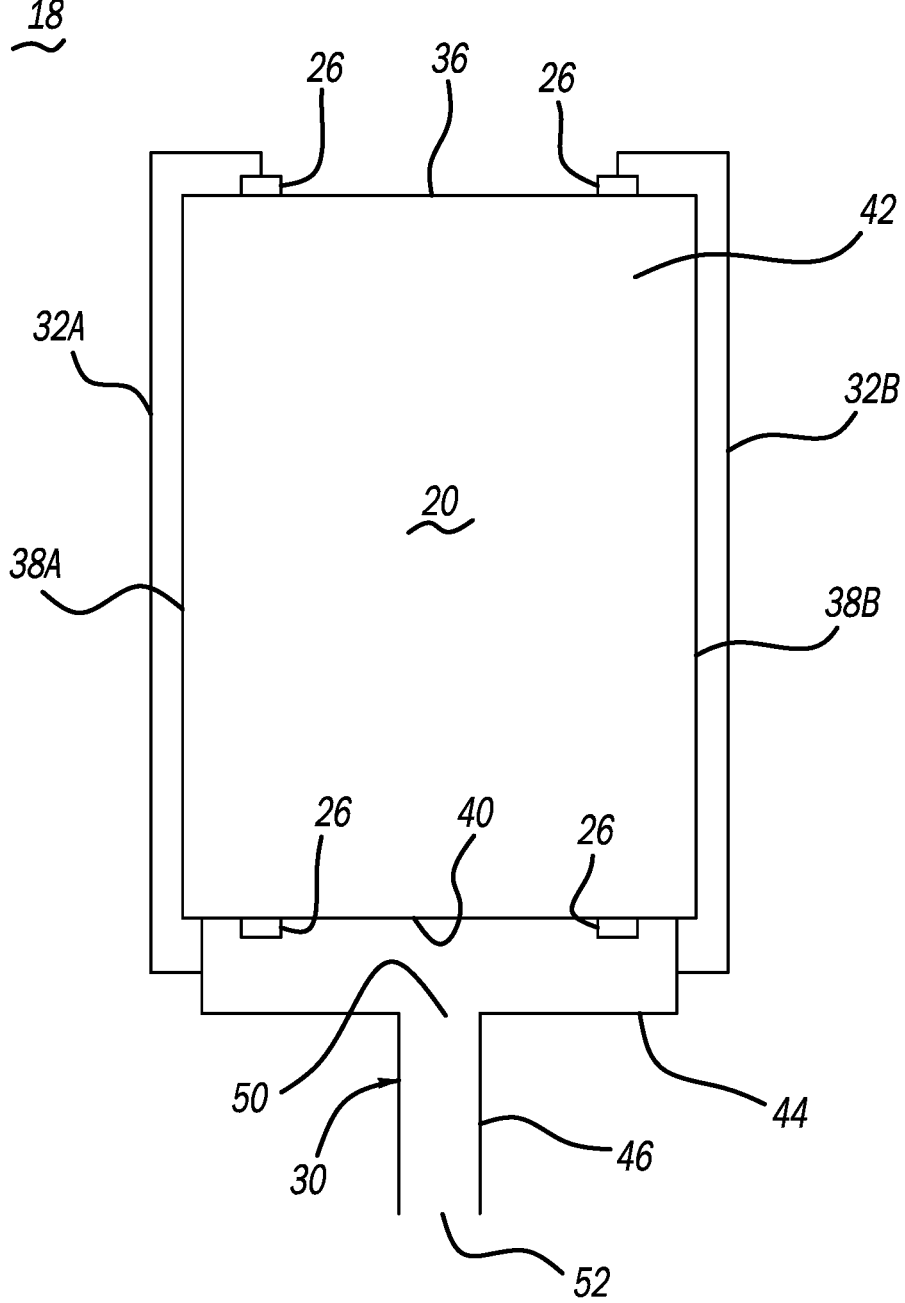
FIG. 4 is a schematic top perspective view of the battery pack illustrated in FIG. 2 including a manifold and a deployable exhaust system according to a principle of the present disclosure where the deployable exhaust system is in a deployed state.
Figure 5:
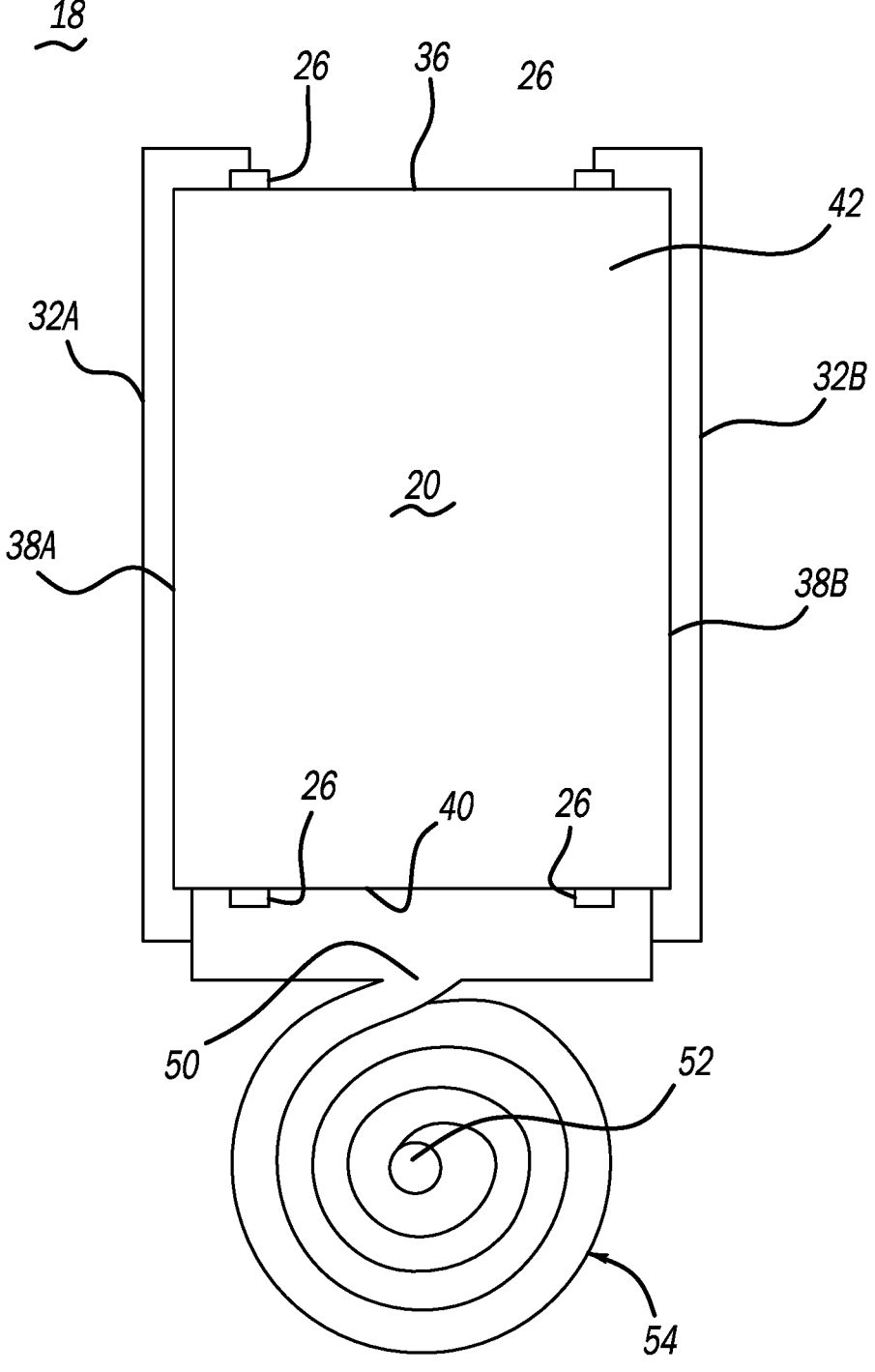
FIG. 5 is a schematic top perspective view of the battery pack illustrated in FIG. 2 including the manifold and the deployable exhaust system according to a principle of the present disclosure where the deployable exhaust system is in a non-deployed state.

Now referring to FIGS. 4 and 5, a deployable battery exhaust gas system 30 according to a principle of the present disclosure is illustrated. Deployable battery exhaust gas system 30 is a passive duct system including a plurality of conduits or ducts 32 that are configured to collect the very hot battery gases from discharge vents 26 that may be generated during a thermal runaway event of battery pack 18. Upon collection of the battery gases generated by batteries 22 of battery pack 18, the ducts 32 of deployable battery exhaust gas system 30 divert the battery gases to a rear 34 of vehicle 10 in a manner similar to a conventional internal combustion engine (ICE) exhaust pipe.

FIG. 4 is a top schematic perspective view of a battery pack 18 where vents 26 located at a forward end 36 are connected to ducts 32a and 32b that extend along sidewalls 38a and 38b of housing 20 of battery pack 18. In the event of a thermal runaway event, pressure within housing 20 may build to an extent that the battery gases generating the pressure can pass through the one-way valves 28 located in vents 26. After being expelled from battery pack 18 through vents 26, the gases will enter ducts 32a and 32b and travel toward a rear end 40 of housing 20 of battery pack 18.

Ducts 32a and 32b may be formed of a flexible material or may be formed of a rigid material. In the illustrated embodiment and due to packaging restraints associated with locating battery pack 18 on vehicle 10, ducts 32a and 32b may be in the form of pipes formed of a rigid metal material that can be attached to the sidewalls 38a and 38b using an attachment device such as a bracket, clamp, or strap (not shown). While ducts 32a and 32b are illustrated as extending along sidewalls 38a and 38b, it should be understood that ducts 32a and 32b could be routed overtop an upper surface 42 of housing 20 or beneath housing 20 without departing from the scope of the present disclosure. In addition, if housing 20 includes vents (not shown) formed on sidewalls 38a and 38b, it should be understood that ducts 32a and 32b may include branches (not shown) that connect with such vents and direct the battery exhaust gases in a direction toward rear end 40 of housing 20.

Vents 26 located at rear end 40 of housing 20 may be in communication with a manifold 44 attached to housing 20 that is configured to collect battery exhaust gases emitted from the vents 26 located at rear end 40 of housing 20. That is, vents 26 located at rear end 40 of housing 20 are each configured to direct the battery exhaust gases emitted therefrom directly into manifold 44. As shown in FIGS. 4 and 5, ducts 32a and 32b may also be in fluid communication with manifold 44 such that battery exhaust gases received from vents 26 located at forward end 36 of housing 20 can be received by manifold 44. Manifold 44 is connected to deployable battery exhaust gas system 30, which in FIG. 4 is illustrated in a deployed (extended) configuration.

Figure 6:
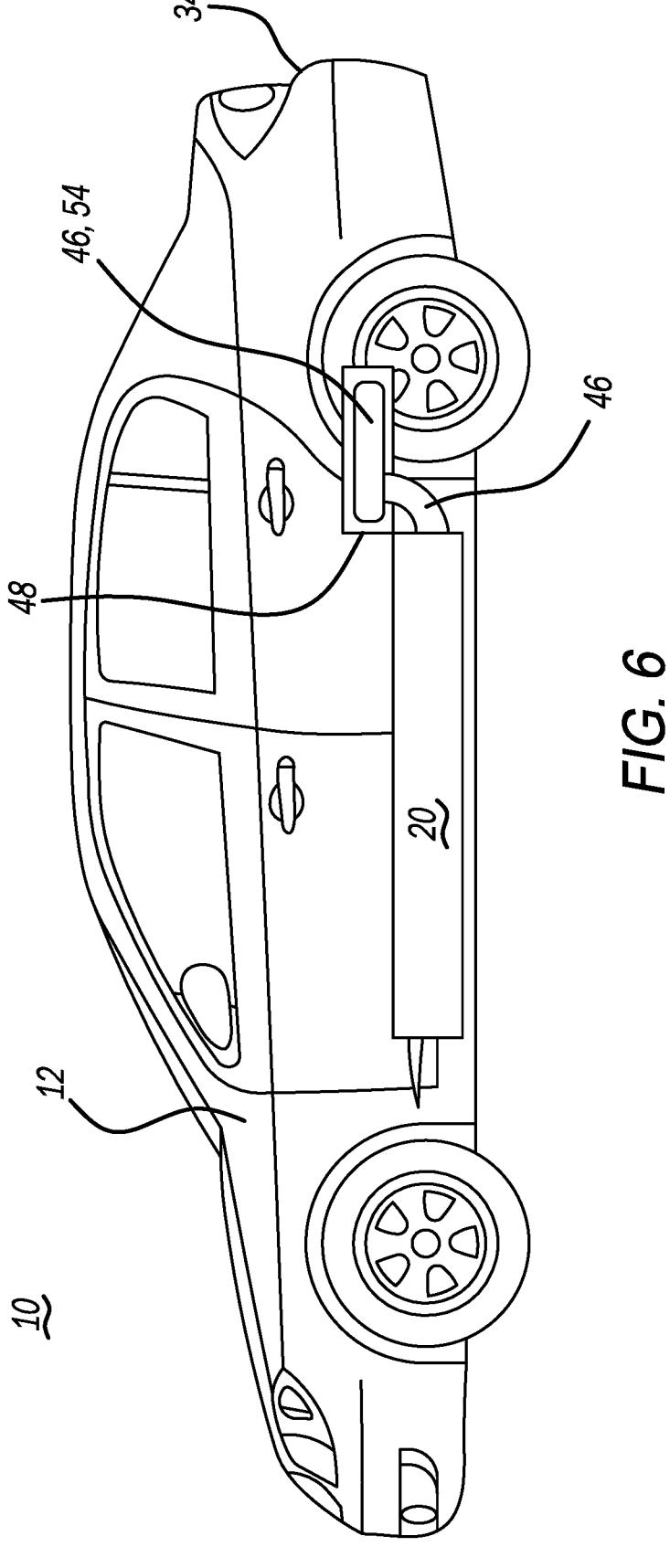
FIG. 6 is a side-perspective view of a vehicle including the deployable exhaust system in the non-deployed state.

More particularly, deployable battery exhaust gas system 30 is in the form of a flexible conduit 46 that is formed of a flexible material such that conduit 46 can be "deployed" during a thermal runaway event. That is, as best shown in FIGS. 5 and 6, flexible conduit 46 may be rolled up and stored in a storage space 48 at a location proximate manifold 44, which will be described in more detail later. Flexible conduit 46 includes an inlet 50 in communication with manifold 44 and an outlet 52 for expelling the battery exhaust gases to the atmosphere. A length of flexible conduit 46 is variable and is based on a distance from the manifold 44 to the rear 34 of vehicle. Inasmuch as battery pack 18 can be located at different locations in different vehicles, the length of flexible conduit 46 can range anywhere from two feet up to twenty-five feet. The important aspect to keep in mind is that flexible conduit 46 is designed to expel the hot battery exhaust gases a safe distance from vehicle 10 to avoid any other components of the vehicle 10 (such as the vehicle tires 14, etc.) from being exposed to the battery exhaust gases. The length may also be selected to make sure that the gases expelled therefrom will not interfere with any occupants exiting the vehicle 10 in the event that the thermal runaway event occurs during operation of vehicle 10.

During a thermal runaway event, the flow of battery exhaust gases that is generated can reach velocities up to and even greater than the speed of sound. As the battery exhaust gases are emitted by vents 26, collect in manifold, and enter inlet 50 of flexible conduit 46, the flexible conduit 46 will begin to fill with the battery exhaust gases. As the flexible conduit 46 begins to fill with the battery exhaust gases, the volume of the battery exhaust gases will cause the rolled flexible conduit 46 to begin to unfurl and extend outward in a direction toward the rear 34 of the vehicle 10 as shown in FIG. 4. Put another way, because conduit 46 is "flexible," as the flexible conduit 46 fills with the high-velocity battery exhaust gases the flexible conduit 46 can be "deployed" in a manner similar to an airbag. Because the battery exhaust gases may be travelling at such a high velocity, the unfurling of flexible conduit 46 to the fully extended position shown in FIG. 4 may occur in a matter of milliseconds (e.g., 50 milliseconds).

Inasmuch as flexible conduit 46 can be deployed in a manner similar to a vehicle airbag, a material that can be used to form flexible conduit 46 can be a material similar to that used in an airbag. Example materials include high-strength woven materials that retain physical integrity against rapid deployment. The woven material may be coated or uncoated, is impermeable to gases, and flame resistant. Example woven materials include polyamide (e.g., NYLON®), or other woven materials known to those skilled in the art.

Figure 7:
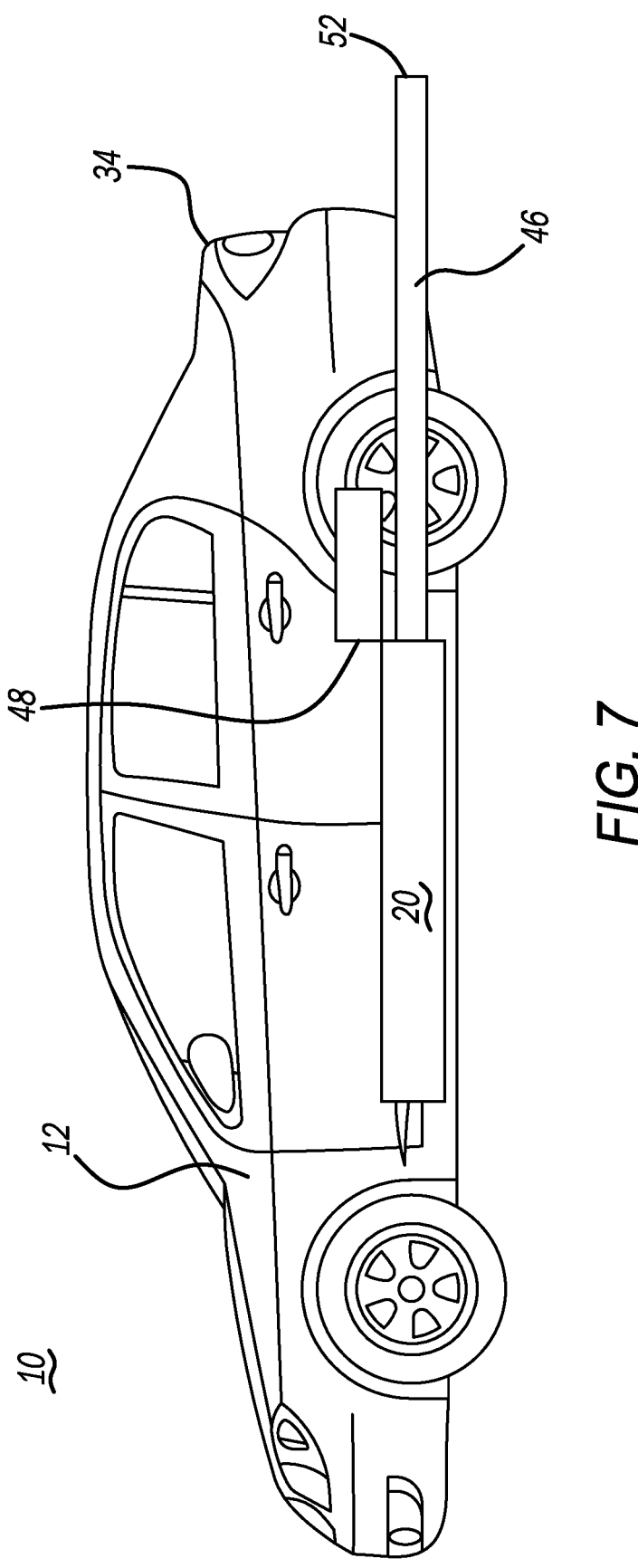
FIG. 7 is a side-perspective view of a vehicle including the deployable exhaust system in the deployed state.

Now referring to FIGS. 6 and 7, it can be seen that flexible conduit 46 can be stored in storage space 48 in vehicle 10. Storage space 48 may be located upward and aft from housing 20 of battery pack 18 such that a portion of flexible conduit 46 attached to manifold 44 extends between manifold 44 and storage space 48, and a rolled section 54 of flexible conduit 46 can be stored in storage space 48. It should be understood that the volume of storage space 48 is enlarged for illustration purposes (as is the rolled section 54 shown in FIG. 5) and, in practice, the volume of storage space 48 and size of rolled section 54 can be substantially reduced in comparison to the embodiment illustrated. In this regard, a small housing of storage space 48 can be attached to a frame (not illustrated) of vehicle 10 or some other structure located adjacent to battery pack 18, and the flexible conduit 46 folded or rolled and stored in the storage space 48 in a manner similar to a vehicle airbag.

During deployment of flexible conduit 46, the velocity of the battery exhaust gases will be sufficient enough to pull the folded or rolled section 54 of flexible conduit 46 from storage space 48 in a relatively controlled manner. That is, the flow of the battery gases into flexible conduit 46 will inflate the flexible conduit 46 and as the flexible conduit 46 begins to inflate, the flexible conduit 46 will be pulled outward from storage space 48 until flexible conduit 46 fully extends like the configuration shown in FIG. 7. As can be seen in FIG. 7, the outlet 52 of flexible conduit 46 is located a safe distance from the rear 34 of vehicle 10 such that the hot exhaust gases being emitted from flexible conduit 46 do not collect beneath vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:
   a battery pack including a housing that stores a plurality of batteries for providing electric power to the vehicle;
   a plurality of vents attached to the housing that are configured to expel exhaust gases generated by the plurality of batteries;
   a manifold located proximate the housing for collecting the exhaust gases expelled by the plurality of vents; and
   a flexible conduit including an inlet in communication with the manifold and an outlet configured to expel the exhaust gases,
   wherein the flexible conduit includes a non-deployed state where the flexible conduit is rolled or folded and stored in a storage space located proximate the manifold, and includes a deployed state where the flexible conduit extends outward from the vehicle upon receipt of the exhaust gases from the manifold.

2. The vehicle according to claim 1, wherein the flexible conduit is configured to inflate after receipt of the exhaust gases from the manifold that extends the flexible conduit to the deployed state from the non-deployed state.

3. The vehicle according to claim 2, wherein the flexible conduit is configured to inflate into the deployed state in about 50 milliseconds.

4. The vehicle according to claim 1, wherein the flexible conduit is formed of a woven material.

5. The vehicle according to claim 4, wherein the woven material is a woven polyamide material.

6. The vehicle according to claim 1, wherein the plurality of vents include at least one vent that is connected to the manifold by a duct that extends between the at lest one vent and the manifold, the duct being located exterior to the housing of the battery pack.

7. The vehicle according to claim 6, wherein the duct is formed of a flexible material or a rigid material.

8. The vehicle according to claim 6, wherein the plurality of vents include at least one vent that is connected to the manifold and expels the exhaust gases directly into the manifold.

9. The vehicle according to claim 1, wherein each of the plurality of vents includes a one-way valve that are actuated to release the exhaust gases upon a predetermined pressure threshold in the housing being reached.

10. The vehicle according to claim 9, wherein the predetermined pressure threshold is 100 millibars.

11. The vehicle according to claim 10, wherein the first pair of ducts are each formed of a flexible material or a rigid material.

12. The vehicle according to claim 10, wherein each of the vents includes a one-way valve that are actuated to release the exhaust gases upon a predetermined pressure threshold in the housing being reached.

13. The vehicle according to claim 12, wherein the predetermined pressure threshold is 100 millibars.

14. A vehicle comprising:
   a battery pack including a housing that stores a plurality of batteries for providing electric power to the vehicle;
   a first pair of vents attached to the housing that are configured to expel exhaust gases generated by the plurality of batteries;
   a second pair of vents attached to the housing that are configured to expel the exhaust gases generated by the plurality of batteries;
   a manifold located proximate the housing for collecting the exhaust gases expelled by the first pair of vents and the second pair of vents;
   a first pair of ducts connected to the first pair of vents and the manifold, the first pair of ducts configured to receive the exhaust gases expelled by the first pair of vents and communicate the exhaust gases to the manifold; and
   a flexible conduit including an inlet in communication with the manifold and an outlet configured to expel the exhaust gases,
   wherein the second pair of vents expel the exhaust gases directly into the manifold; and
   wherein the flexible conduit includes a non-deployed state where the flexible conduit is rolled or folded and stored in a storage space located proximate the manifold, and includes a deployed state where the flexible conduit extends outward from the vehicle upon receipt of the exhaust gases from the manifold.

15. The vehicle according to claim 14, wherein the flexible conduit is configured to inflate after receipt of the exhaust gases from the manifold that extends the flexible conduit to the deployed state from the non-deployed state.

16. The vehicle according to claim 15, wherein the flexible conduit is configured to inflate into the deployed state in about 50 milliseconds.

17. The vehicle according to claim 14, wherein the flexible conduit is formed of a woven material.

18. The vehicle according to claim 17, wherein the woven material is a woven polyamide material.

* * * * *